(12) United States Patent
Wu

(10) Patent No.: US 6,275,575 B1
(45) Date of Patent: Aug. 14, 2001

(54) METHOD AND SYSTEM FOR COORDINATING AND INITIATING CROSS-PLATFORM TELEPHONE CONFERENCES

(75) Inventor: Philip L. Wu, Saratoga, CA (US)

(73) Assignee: Right4Me.com, Inc., Palo Alto, CA (US)

(*) Notice: Subject to any disclaimer, the term of this patent is extended or adjusted under 35 U.S.C. 154(b) by 0 days.

(21) Appl. No.: 09/481,341

(22) Filed: Jan. 12, 2000

(51) Int. Cl.[7] .................................................. H04M 3/42
(52) U.S. Cl. ........................ 379/202.01; 379/204.01; 455/416; 455/518; 370/260
(58) Field of Search .......................... 379/202.01, 203.01, 379/204.01, 205.01, 93.21; 370/260; 455/415, 416, 517, 518, 519

(56) References Cited

U.S. PATENT DOCUMENTS

| | | |
|---|---|---|
| 4,796,293 | 1/1989 | Blinken et al. . |
| 5,099,510 | 3/1992 | Blinken, Jr. et al. . |
| 5,408,518 | 4/1995 | Yunoki . |
| 5,422,883 | 6/1995 | Hauris et al. . |
| 5,459,859 | 10/1995 | Senda . |
| 5,465,391 | 11/1995 | Töyrylä . |
| 5,546,449 | 8/1996 | Hogan et al. . |
| 5,594,859 | 1/1997 | Palmer et al. . |
| 5,619,555 | 4/1997 | Fenton et al. . |
| 5,797,100 | 8/1998 | Dettner . |
| 5,809,018 | 9/1998 | Lehmusto . |
| 5,828,743 | 10/1998 | Pinnell et al. . |
| 5,859,904 | 1/1999 | Huang . |
| 5,861,907 | 1/1999 | Wada . |
| 5,872,841 | 2/1999 | King et al. . |
| 5,917,817 | 6/1999 | Dunn et al. . |
| 5,933,778 | 8/1999 | Burhrmann et al. . |
| 5,953,400 | 9/1999 | Rosenthal et al. . |
| 5,970,417 | 10/1999 | Töyrylä et al. . |
| 5,974,406 | 10/1999 | Bisdikian et al. . |

FOREIGN PATENT DOCUMENTS

| | | |
|---|---|---|
| 0 921 670 A2 | 6/1999 | (EP) . |
| 0 969 687 A1 | 1/2000 | (EP) . |
| WO97/34406 A1 | 9/1997 | (WO) . |

OTHER PUBLICATIONS

"Calender Scheduling Teleconference Communication Mechanism," IBM Technical Disclosure Bulletin,vol. 37, No. 3, Mar. 1, 1994, p. 561, IBM Corp., New York, U.S.A.>.

*Primary Examiner*—Creighton Smith
(74) *Attorney, Agent, or Firm*—Kristin L. Johnson, Esq.; Dean W. Russell, Esq.; Kilpatrick Stockton LLP

(57) ABSTRACT

A method and system for remotely accessing a multi-point cross-platform telephone conferencing system for the purpose of coordinating and initiating multi-point telephone conference meetings utilizing intelligent agents and network based software application modules (i.e., contact lists, email, calendars, etc.) to facilitate the setup and initiation of telephone conference calls from locations remote to the cross-platform teleconferencing system. A coordinator, with the assistance of software agents resident on a coordinating server device and menu screens resident on the networked terminal device selects subscribers for inclusion in the telephone conference (with or without information modification), inputs attribute data and contact information for non-subscribers to be included in the telephone conference and inputs descriptive information including an identifier, proposed times and duration for the proposed telephone conference. The software agents analyze the conference information, the subscriber and non-subscriber attribute data (which may include information relating to the various terminal devices associated with particular subscribers/non-subscribers) and the available schedule information and generates/forwards appropriately formatted invitations to those invited. Subscriber/non-subscriber responses to the invitations are forwarded to the coordinating server device and the coordinating server.

24 Claims, 14 Drawing Sheets

Daily Contact Calendar for Brian Spasky

Primary Contact Number: [650-555-1000]

First Alternate Number: [650-555-1065]     Date (mm/dd/yyyy): [12/25/1999]

Start Time: [1:30]     AM ☐  PM ■

End Time: [4:00]     AM ☐  PM ■

Second Alternate Number: [650-555-1211]     Date (mm/dd/yyyy): [12/25/1999]

Start Time: [6:30]     AM ☐  PM ■

End Time: [7:00]     AM ☐  PM ■

*Figure 6*

METHOD AND SYSTEM FOR COORDINATING AND INITIATING CROSS-PLATFORM TELEPHONE CONFERENCES

BACKGROUND OF THE INVENTION

1. Field of the Invention

The present invention relates to a method and system for coordinating and initiating a multi-point telephone conference which can be initiated by one of the participants from a remote device such as a wireless communication device. More specifically, the invention relates to a method and system designed for use in setting up and initiating a multi-point telephone conference with assistance from network based software agents capable of accessing, utilizing and downloading information to wireless communication devices from network-based software applications (e.g., calendars, contact lists, email lists etc.).

2. Description of the Related Arts

Webster's Dictionary defines the term meeting as a coming together; a gathering. Meetings play an integral part in our social and organizational interactions. Advances in computer and communications technology have effectively removed geographic barriers that hindered meetings between geographically separated individuals and organizations in the past. The explosion of the Internet and the availability of low cost network-compatible wireless communication devices (e.g., cellular phones, PDAs, two-way pagers, etc.) makes it possible for individuals and organizations to communicate using a variety of media (e.g., voice, email, short message service (SMS), etc.) regardless of the geographic locations of the participants. It is predicted that by the year 2005 there will be one billion wireless communication devices carried on the persons of individuals who will be accessible virtually any place and any time.

Many companies in the late 80's and early 90's began emphasizing horizontal problem solving in corporate planning as opposed to hierarchical decision making which meant more planning done in more meetings and brainstorming sessions comprised of large groups of people. Around this same time corporations and organizations sought methods and systems which would allow remote parties to actively participate in these sessions. In response, telecommunications companies began offering audio teleconferencing services.

In the early 1990's the methodology used for multi-point telephone conference calls was based on public branch exchange (PBX) conference bridges. These systems required trained operators and on-premises dedicated equipment and were cost prohibitive for all but the largest companies. The primary problem with PBX conference bridges was that one individual had to be physically at a telephone attached to the PBX for the system to work. Setting up telephone conferences during non-business hours proved to be especially troublesome.

To meet the increasing demand for telephone conference calls, teleconference service bureaus were established which enabled small businesses and individuals to access these services from third party providers for a fee. To use this service, all the contact information for all participants had to be provided to the third party provider hours or days before the scheduled teleconference and the participants had to call in to a predetermined number at a scheduled time. Operators handled participant notification and call setup and these systems provided little flexibility for changing contact information.

Some present day teleconferencing services provide Internet/Intranet based automated conference setup services that facilitate the setup of conference calls with the assistance of web based user interfaces and interactive voice response units. In these systems the user usually requires advanced knowledge of the contact information for the conference participants. For example, a user would generally have to provide an email address or phone number which is used to propose the telephone conference and provide the participants with instructions for joining the conference call.

The ultimate purpose of teleconferencing systems is to facilitate simultaneous communications between a plurality of participants who are geographically separated. As with any meeting, the required participants have to be notified in advance of the time and the topic of interest for a proposed telephone conference meeting. The problem of coordinating and initiating such conference calls is compounded when one or more of the required participants is off-site and has a plurality of associated contact identifiers. For example, it is not uncommon for individuals to have multiple email addresses, a home phone number, a work phone number, a mobile phone number, a SMS contact identifier, etc. This situation is further complicated when the teleconferencing system is required to coordinate a cross-platform telephone conference call with terminal devices (i.e. land based phones, wireless devices, IP phones, etc.) operating on different types of communication networks. Cross-platform telephone conferencing systems and so-called intelligent agents are available but they generally require dedicated server devices and associated software costing tens of thousands of dollars which would make them unappealing to many small businesses and individual users desiring to use this type of service.

What is needed is a method and system which enables users of wireless communication devices to access cross-platform telephone conference services and to functionally interact with the control features of a cross-platform telephone conference server systems from a remote location for the purpose of coordinating and initiating telephone conference meetings.

SUMMARY OF THE INVENTION

An object of the present invention is therefore to provide a method and system for remotely accessing a cross-platform telephone conference system for the purpose of coordinating and initiating multi-point telephone conference meetings. More specifically, the present invention utilizes intelligent agents and network based software application modules (i.e., contact lists, email, calendars, etc.) to facilitate the setup and initiation of telephone conference calls from locations remote to the telephone conference server and associated equipment.

In accordance with an embodiment of the present invention, a coordinating server device including an interactive voice response unit (IVRU) and a storage means for storing attribute data, contact information and schedule information for a plurality of subscribers is remotely accessed using a networked terminal device (i.e., a personal computer, a cellular phone, a PDA, etc.) by a coordinating subscriber (referred to as the coordinator hereafter) for the purpose of proposing a multi-point telephone conference. The coordinator, with the assistance of software agents resident on the coordinating server device and menu screens resident on the networked terminal device selects subscribers for inclusion in the telephone conference (with or without information modification), inputs attribute data and contact information for non-subscribers to be included in the telephone conference and inputs descriptive information including an identifier, proposed times and duration for the proposed telephone conference. The software agents analyze the conference information, the subscriber and non-subscriber attribute data (which may include information relating to the various terminal devices associated with particular subscribers/non-subscribers) and the available schedule information for the selected participants and generates/forwards appropriately formatted invitations to those invited. Subscriber/non-subscriber responses to the invitations are forwarded to the coordinating server device and the coordinator's terminal device.

In response to the received responses from the subscribers and non-subscribers, the coordinating server device generates and stores a control script for a pre-designated telephone conference server in association with coordinator identification information and the telephone conference identifier. To initiate the telephone conference the coordinator accesses the coordinating server device, selects the identifier for the previously stored telephone conference and inputs a pre-designated key sequence (e.g., depresses a softkey labeled conference, enters a PIN, etc.). Additionally, the coordinator may input scheduling information for the multi-point telephone conference which would enable the telephone conference server to automatically initiate contact with the selected participants at a pre-determined time.

According to another aspect of the present invention, the coordinating server device includes storage means for storing a Lightweight Directory Access Protocol (LDAP) software module. This software module provides limited access to network based client applications and other server devices for the purpose of retrieving subscriber and non-subscriber attribute and schedule information to be used in generating telephone conference invitations and conference initialization.

The foregoing and other objects, features and advantages of the invention will become more apparent from the following detailed description, which proceeds with reference to the accompanying drawings.

BRIEF DESCRIPTION OF THE DRAWINGS

FIG. 6 illustrates representative schedule display screens for a subscriber in conjunction with the implementation of the present invention.

DETAILED DESCRIPTION

Figure 1:
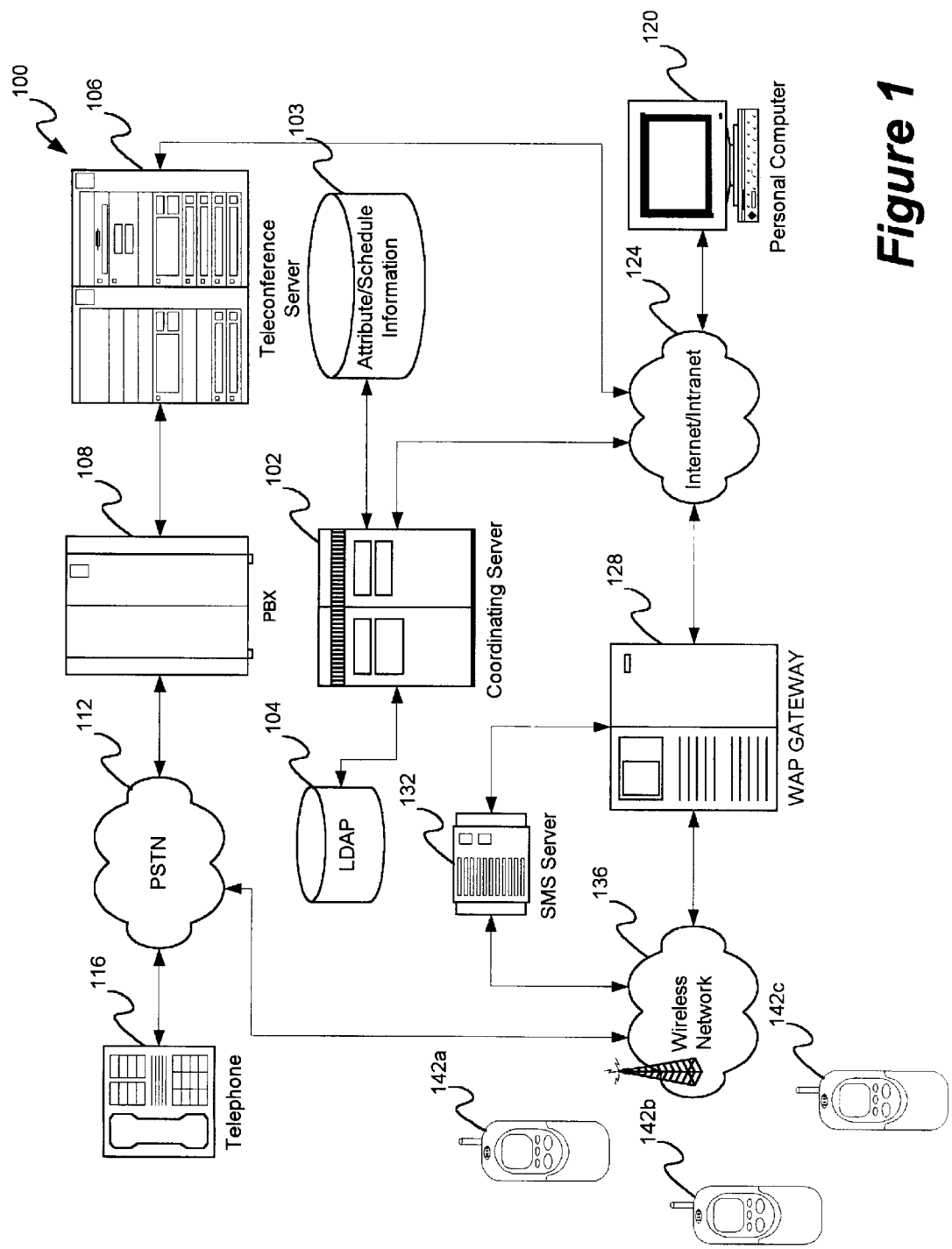
FIG. 1 is a block diagram of a communications system which may be used to implement a method and system embodying the invention.

The invention pertains to a method and a system for coordinating and initiating cross-platform multi-point telephone conferences (also referred to as telephone conferences herein) using remotely located terminal devices, software agents and remotely stored participant information (i.e., information contained in association with network based calendar, email and scheduling applications).

Terminal devices, also referred to as networked terminal devices herein, include but are not limited to personal computers, laptop computers, computer terminals, personal digital assistants, palm-sized computing devices, and networked wireless communications devices such as micro-browser enabled cellular telephones. Such devices typically have a user interface comprised of a display, an input interface (i.e., a keypad) and a pointing device (e.g., a mouse, a trackball, a joystick, a navigation key-set or a touch-pad).

In the following detailed description of the present invention, numerous specific details are set forth in order to provide a thorough understanding of the present invention. However, it will become apparent to those skilled in the art that the present invention may be practiced without these specific details. In other instances, well known methods, procedures, components, and circuitry have not been described in detail to avoid unnecessarily obscuring the novel aspects of the present invention.

The detailed description of the present invention in the following are presented largely in terms of procedures, steps, logic blocks, processing, and other symbolic representations that resemble data processing devices coupled to networks. These process descriptions and representations are the means used by those experienced or skilled in the art to most effectively convey the substance of their work to others skilled in the art.

The present invention is a method and system, which will allow the user of a terminal device to coordinate and initialize a multi-point telephone conference from a remote location. The method along with the system to be described in detail below is a sequence of processes or steps leading to a desired result. These operations or processes are those requiring physical manipulations of physical quantities. Usually, though not necessarily, these quantities may take the form of electrical signals capable of being stored, transferred, combined, compared, displayed and otherwise manipulated in a computer system or electronic computing devices. It proves convenient at times, principally for reasons of common usage, to refer to these signals as bits, values, elements, symbols, operations, messages, terms, numbers, or the like. It should be borne in mind that all of these similar terms are to be associated with the appropriate physical quantities and are merely convenient labels applied to these quantities. Unless specifically stated otherwise as apparent from the following description, it is appreciated that throughout the present invention, discussions utilizing terms such as "processing" or "computing" or "verifying" or "displaying" or the like, refer to the actions and processes of a computing device that manipulates and transforms data represented as physical quantities within the terminal device's registers and memories into other data similarly represented as physical quantities within the computing device or other electronic devices.

FIG. 1 shows a basic system configuration in which the present invention may be implemented in accordance with a preferred embodiment. Cross-platform communications system 100 generally includes a plurality of communications networks such as public switched telephone network (PSTN) 112, Intranet/Internet 124 and wireless network 136. These communications networks support communications between a plurality of diverse terminal devices as illustrated by telephone 116, personal computer 120 and wireless communication devices 142a, 142b and 142c having differing communication protocols and operational parameters. Server devices such as Wireless Access Protocol (WAP) gateway 128 facilitate intra-network communications. Server devices such as coordinating server 102, teleconference server 108, and Short Message Server (SMS) server 132 perform service functions for the various terminal devices as will be described below.

Coordinating server device 102, which may be a network connected SUN workstation, includes storage means 103 for storing attribute data, contact information and schedule information for a plurality of subscribers and any associated software applications. Additionally, coordinating server device 102 includes storage means for storing a Lightweight Directory Access Protocol (LDAP) software module which facilitates limited access to subscriber and non-subscriber information not contained within the domain of the coordinator assigned files. The LDAP software module provides a means for getting information from different vendor applications (i.e., such as email and contact lists) and databases which may be resident on diverse platforms.

The description of coordinating server device 102 provided above is provided for purposes of illustration and not limitation. It would be understood by one of skill in the art that the present invention may be practiced in a computer system having single or multiple processing units, and system components that differ from those described above.

Coordinating server device 102 receives input from a coordinator associated with a proposed multi-point telephone conference. Software agents resident within the memory of coordinating server device 102 generate invitations for the requested participants using the input received from the coordinator and any associated participant information (i.e., attributes and schedules) which may be stored on the coordinating server device 102 or on an accessible remote server device (not shown). The generated invitations may be forwarded to the selected participants using a voice channel (wireless or land-based) and an IVRU, using a paging communication system, using SMS server 132 and the associated narrowband channel or via e-mail. The coordinating server device 102 receives responses from the invited/-telephone conference participants and generates/stores a script which may be utilized at a future time to direct the operation of teleconference server 106 in conjunction with further instructions from the multi-point telephone conference coordinator.

Teleconference server 106 functions to coordinate audio communications with the plurality of invited participants when the telephone conference commences. Upon commencement of the telephone conference telephone conference server 106 can be instructed to automatically contact those participants who responded positively to the conference invitation or can coordinate the meeting as the participants join the multi-point telephone congress in progress. Teleconference server 106 establishes audio circuits to the specified terminal devices via PBX 108 and PSTN 112. Additionally, telephone conference server 106 may provide utilities for adding and/or subtracting participants while the multi-point telephone conference is in progress.

SMS server 132 provides a convenient means to deliver conference related text and voice messages (via the IVRU) to invited participants associated with wireless communication devices such as wireless communication devices 142a, 142b and 142c. Participants receiving invitations in this manner could also be presented with menu screens that simplify the acknowledgment process.

Consider a scenario in which a coordinator wishes to propose a multi-point telephone conference with a plurality of participants for which some information is known, such as a name identifier and some form of contact information. Successful coordination and initialization of the multi-point telephone conference from a location remote to that of an associated teleconference server (i.e., teleconference server 106 of FIG. 1) implies the confluence of four conditions, namely:

a) the selected participants have access to a terminal device, b) the coordinator has provided the correct contact information for the particular terminal devices for which the selected participants have access, c) the coordinator is able to initiate communication to the particular terminal device or devices (either directly or through an intermediate server device) which are accessible to the selected participants at the time of invitation delivery, and d) the activities of the coordinator, the participants and the associated teleconference server can be coordinated at the appointed time of the multi-point telephone conference from the respective locations of all parties involved.

However, in this current era of communication diversity, it would not be unusual for one or more of the selected participants to have multiple terminal devices (e.g., a cell phone, a pager, a networked connected computer, and multiple land lines) and time sensitive contact information.

In accordance with an embodiment of the present invention, when a coordinator proposes a multi-point telephone conference to a plurality of selected participants, the coordinator input the available participant information. If one or more of the selected participants subscribes to the same network resources (i.e., belongs to the same cyber-community) as the coordinator then software agents resident on the coordinating server device (i.e., coordinating server device 102 of FIG. 1) compare the information provided by the coordinator with the information associated with the network resources for the selected participants and either retrieve the participant recommended contact and attribute information or utilize the default information provided by the coordinator. The network resources may be comprised of a network-based organizer, an email program, a contact list or any similar network-based client applications and/or databases. The network resources and client applications of non-subscribing selected participants may be accessed and utilized in a similar fashion as those of subscribing participants with the assistance of the LDAP software module.

The coordinator can prose and/or initiate a multipoint telephone conference from any of the terminal devices associated with the cross-platform communications system 100. Using a land-based telephone 116, the coordinator may access the coordinating server device 102 via a standard switch telephone network and associated connection circuitry (not shown in FIG. 1). Using a personal computer 120, the coordinator may access the coordinating server device 102 using a TCP/IP or similar type network such as Internet/Intranet 124. Using a wireless communication device such as 142*a*, the coordinator may access the coordinating server device 102 via wireless network 136 (e.g., CDMA, TDMA, PHS, GPRS, GSM wireless networks, etc.) and WAP gateway 128.

Figure 2A:
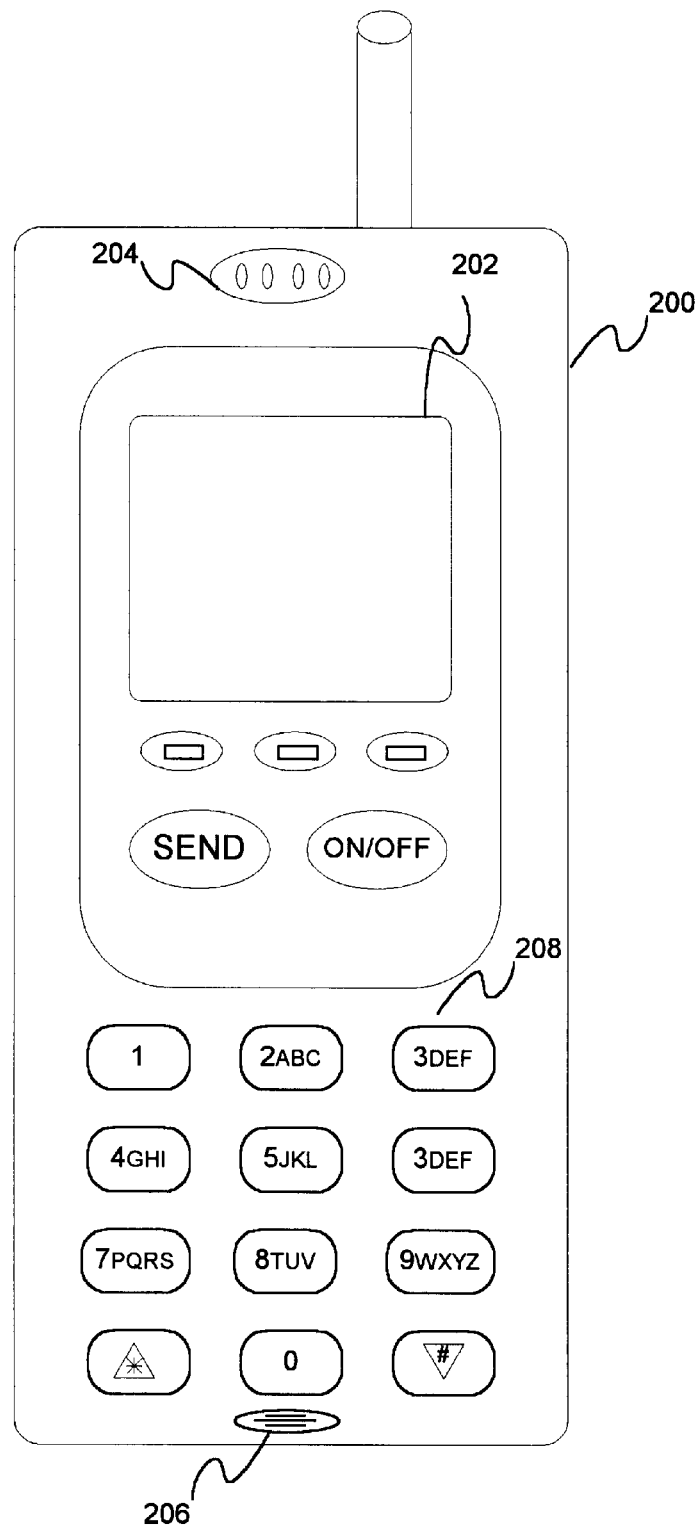
FIGS. 2A and 2B illustrate a representative wireless communication device which may be used in conjunction with the implementation of the present invention.

FIG. 2A illustrates a representative wireless communications device 200 (i.e., a cellular phone) which may correspond to one of the wireless communication devices (i.e., 142*a*, 142*b* or 142*c*) represented in FIG. 1. Wireless communication device 200 includes a display screen 202, a speaker 204, a microphone 206, and a user interface 208 including alphanumeric input elements, control keys and soft keys. Wireless communication device 200 is capable of processing binary language files and/or markup language files (e.g., HDML, WML, XML, SGML, cHTML and HTML) particularly suited for the resources/capability of the devi in question and the networked server devices with which wireless communication device 200 interacts.

Figure 2B:
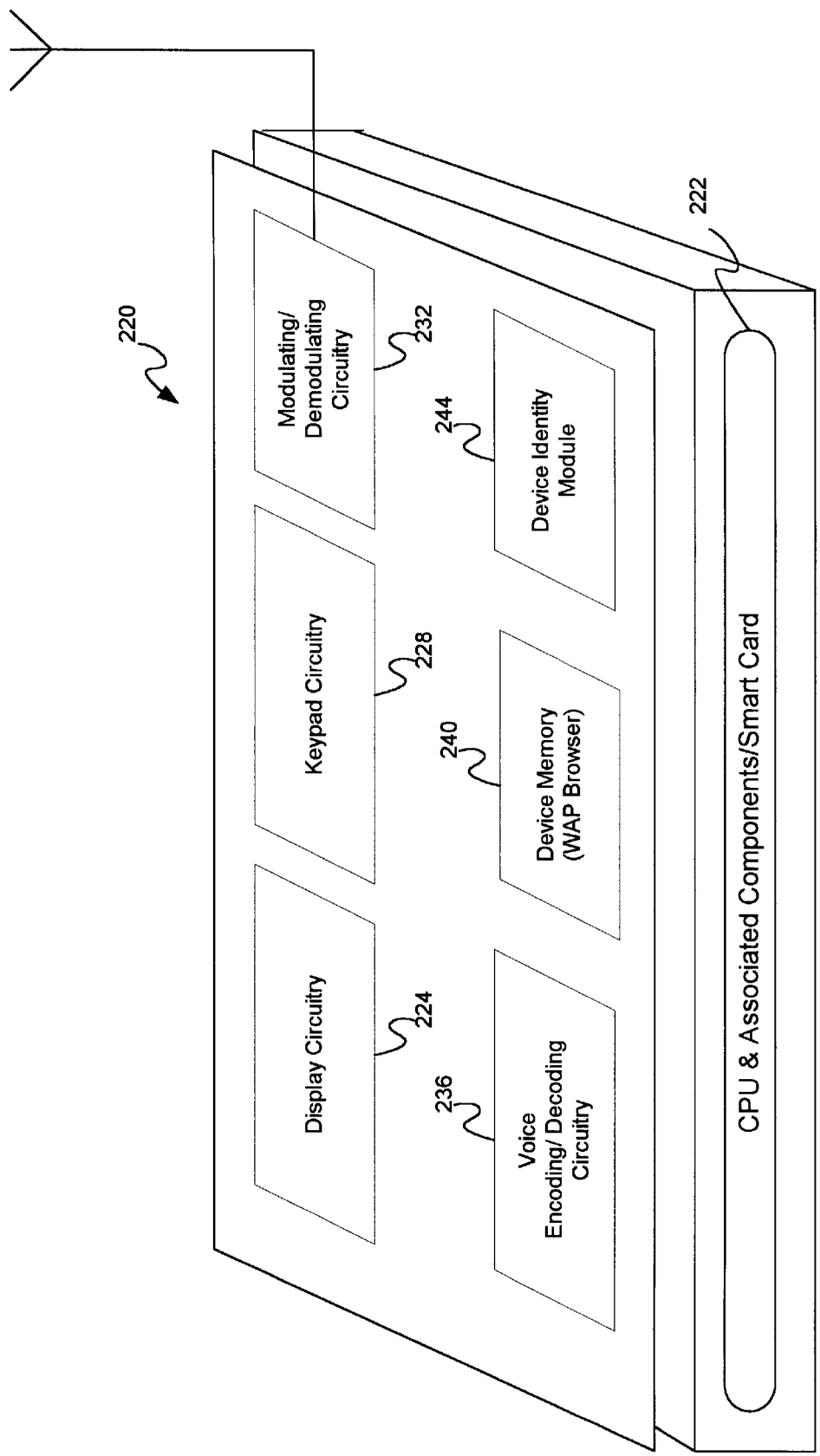

With reference now to FIG. 2B, wireless communications device 220 (which may be wireless communications device 200 of FIG. 2A) illustrates the functional components of a wireless communication device which may be used in conjunction with the practice of the present invention. Wireless communication device 220 includes CPU and/or smart card 222, display circuitry 224, keypad circuitry 228, modulating/demodulating circuitry 232, encoding/decoding circuitry 236, a device memory for storing among other things a micro-Browser for processing binary language files and/or markup language files and a device identity module 244.

Coordinators and participants can utilize wireless communication devices (i.e., wireless communication device 200 of FIG. 2A) to interact with the coordinating server device for the purpose of proposing multi-point telephone conferences, initiating telephone conferences and responding to invitations. The binary language files and/or markup language files provide menu screens and softkey assignments which facilitate the above described functionality when interacting with a remote server device such as coordinating server device 102 of FIG. 1.

Figure 3:
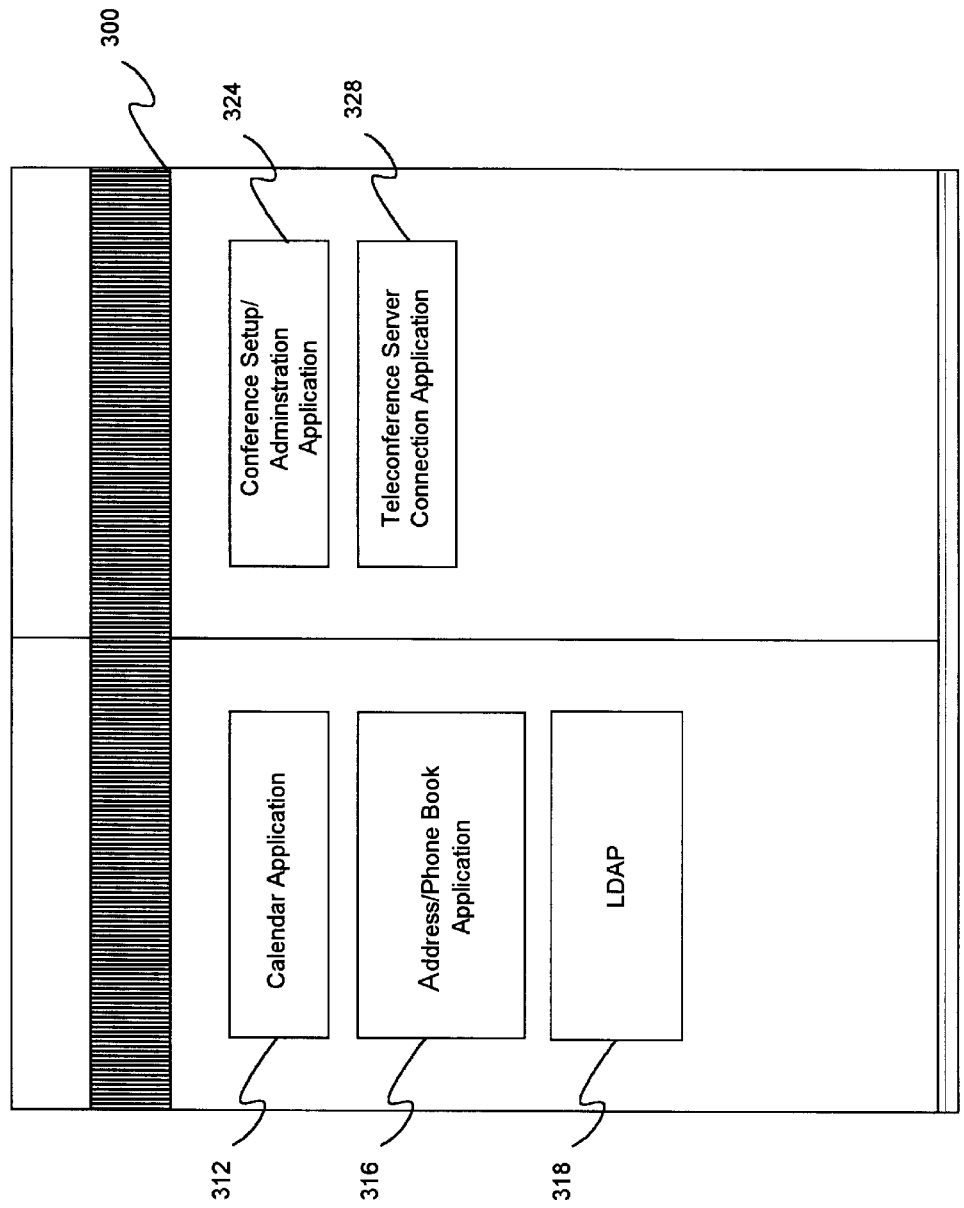
FIG. 3 illustrates a representative server and associated software modules which may be used in conjunction with the implementation of the present invention.

FIG. 3 illustrates a coordinating server device 300 which may be coordinating server device 102 of FIG. 1. Coordinating server device 300 includes one or more community client applications (i.e., calendar application 312 and address/phone book application 316) and dedicated storage areas for individual subscribers. In accordance with an embodiment of the present invention, subscribers may be granted limited access to the dedicated storage areas assigned to other subscribers for the purpose of retrieving/confirming information (i.e., contact information and attributes) associated with participants who have been selected to participate in a proposed telephone conference.

Coordinating server device 300 also includes several functional software modules/agents which facilitate communication between local and remote applications and devices. LDAP software module 318 facilitates the limited access, provided to non-dedicate storage areas assigned to other subscribers. Additionally, LDAP software module 318 may provide similar limited access privileges to server devices and client applications assigned to subscribers associated with other cyber-communities (i.e., networked client applications assigned to subscribers on non-associated server devices).

Conference setup/administration software module 324 processes the coordinator input and replaces coordinator provided participant attribute/call information with participant provided attribute/call information where required. For example, if a coordinator provides a work phone number for a selected participant and the participant indicates in his or her dedicated area an alternate phone number for particular times in question, then the conference setup/administration software module 324 may replace the coordinator provided phone information with the participant provided phone nformation.

Teleconference server connection application 308 generates and manages a script for teleconference server control based on the input/content received from the various sources including coordinator input and information retrieved from participant dedicated storage areas. The generated script is stored until the telephone conference is initiated by the coordinator, at which time it is forwarded to the teleconference server that is managing the associated telephone conference.

Figure 4A:
FIGS. 4A to 4C illustrate representative graphical user interface screens which may be used to input conference and participant information in conjunction with the implementation of the present invention.
Figure 4B:
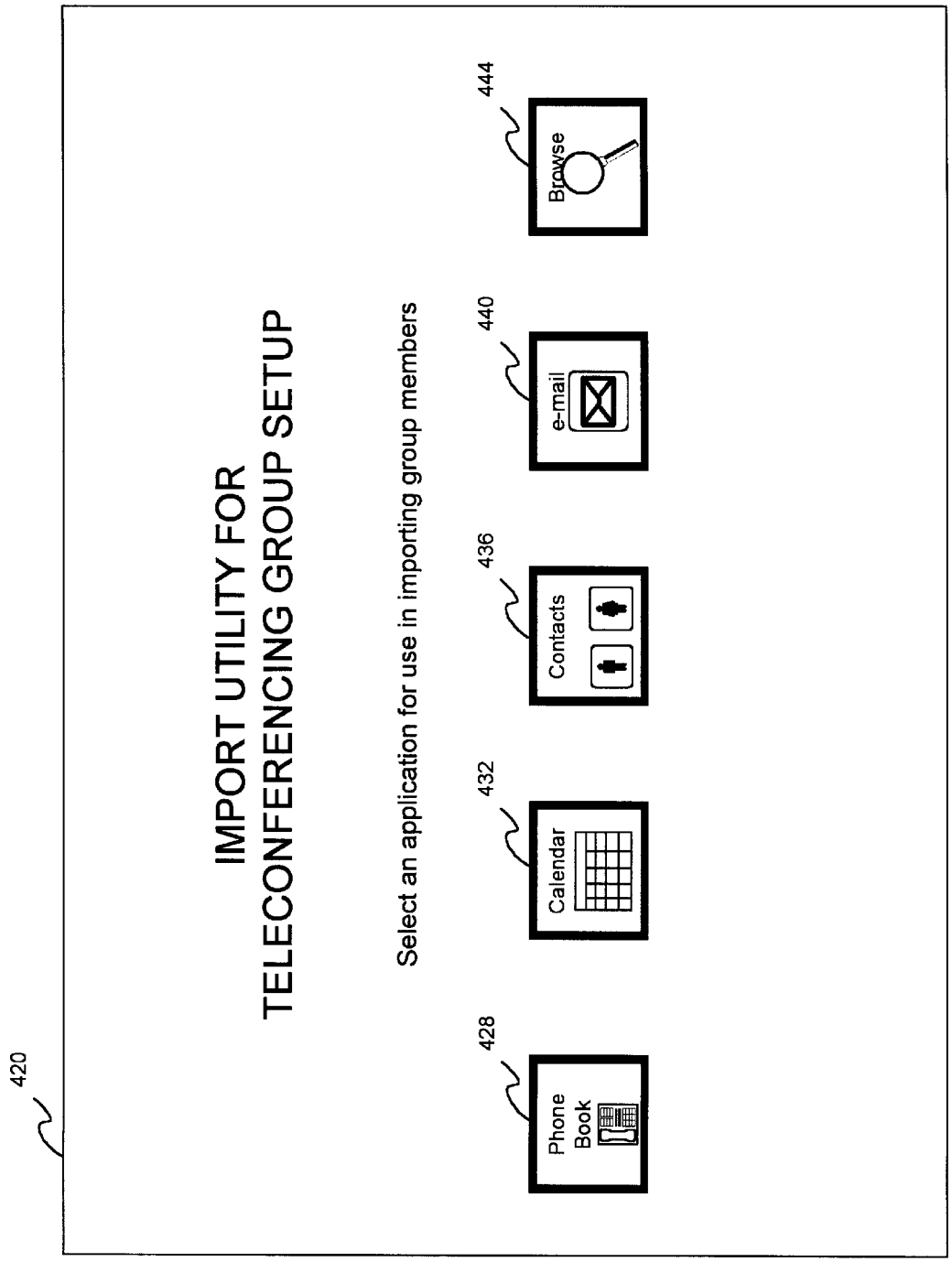
Figure 4C:
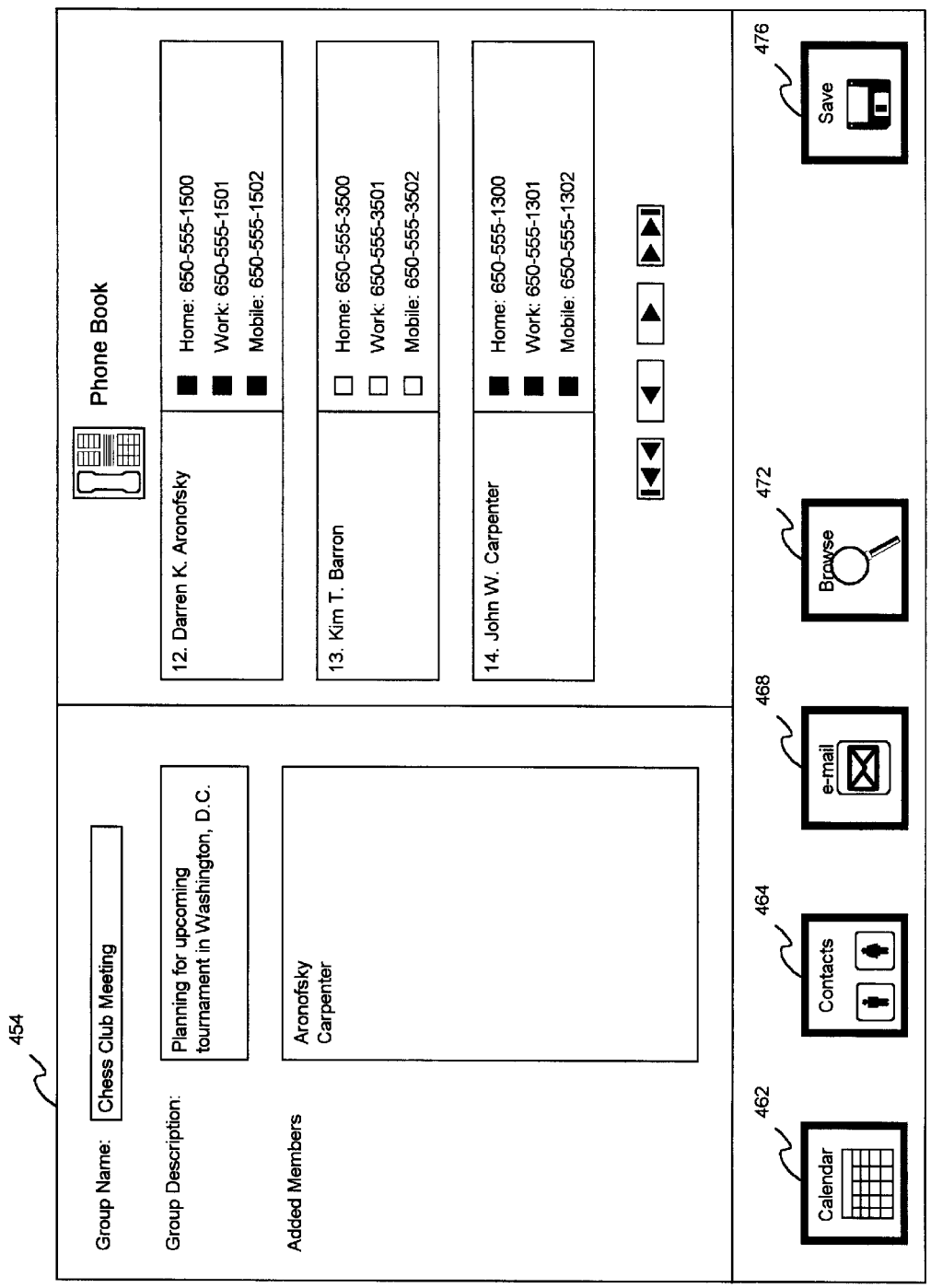

FIGS. 4A to 4C illustrate a series of representative user interface screens which may be used by a coordinator to input information from a terminal device (e.g., a personal computer) in conjunction with the implementation of the present invention. Referring to FIG. 4A, the user interface screen 400 includes a button bar 404, a conference information section 408 and a time scheduling/retrieval mode section 412. Button bar 404 is comprised of a plurality of buttons (i.e., <Save>, <New>, <Call>, <Print>, <Propose> and <Close>>) which are associated with assigned application-level functions. These buttons and their assigned functions are typically activates through an interaction with a pointing device (e.g., a mouse, a track ball, a touch pad etc.).

Graphical user interface screen 400 facilitates coordinator input of conference information (i.e., conference title, conference scheduling information, participant identifiers and participant contact information). The coordinator, inputting the conference information for a given telephone conference, has the option of supplying one or more default contact identifiers to be used in the invitation and/or conference initialization process or of having the coordinating server device software agents (coordinating server device 102 of FIG. 1) retrieve participant contact information based on the participant identifiers provided using the <SMART LOOK> option shown in section 412. If the <SMART LOOK> option is selected then the coordinating server device software agents will retrieve contact information from the selected participant's designated storage areas (i.e. the participant's daily schedule). If the coordinating server device software agents are unable to retrieve the required contact information from the participant's storage areas then the default contact information provided by the coordinator or contact information retrieved from the coordinator's dedicated storage areas may be used in the process of conference notification and/or initiation. If the coordinator provides multiple default contact identifiers then the system will serially make contact attempts until a positive response is achieved or the process times out.

The coordinator, in the scenario illustrated in FIG. 4A, has provided conference information for a telephone conference labeled <Chess Club Meeting>. The coordinator has provided identifiers for all the selected participants, and default contact information for the participants identified as <Spasky>, <Fisher>, <Carpenter> and <Aronofsky>. The <SMART LOOKUP> option is selected for all the selected participants with the exception of <Aronofsky> for whom the default number will be used for all communications. Only identification information is provided for the selected participant labeled <Pi> therefore contact information will have to be retrieved by the coordinating server device software agents from files associated with <Pi>, the coordinator or a central lookup file. For the others, contact information retrieved by the coordinating server device software agents or the default numbers will be used.

Referring to FIG. 4B, graphical user interface screen 420 illustrates a representative interface by which a coordinator could access network-based client applications (i.e., phone book 428, calendar 432, contact list 436, email application 440) and any associated databases for the purpose of retrieving participant information. Local files resident on the terminal device or accessible through an associated network may be accessed using the <Browse> function 444. The selected participants may have similar network-based client applications resident on the same server device or on an accessible server device. Contact information and schedules for the participants and the coordinator may be held in data files associated with these network-based client applications. This information may be used in the telephone conference setup process and in conference initiation.

Referring now to FIG. 4C, graphical user interface screen 454 illustrates a representative interface that could be used by a coordinator to transfer information from the coordinator's network files to the conference setup applications.

The graphical user interface screens illustrated in FIGS. 4A to 4C are provided for purposes of illustration and not limitation. It would be understood by one of skill in the art that the present invention may be practiced using user interfaces and terminal device that differ from those described above. For example, the telephone conference can be set up using a wireless communication device (i.e., a cellular phone) and graphical user interface screens that are appropriately suited to that type of terminal device as is illustrated in FIGS. 5A and 5B.

Figure 5A:
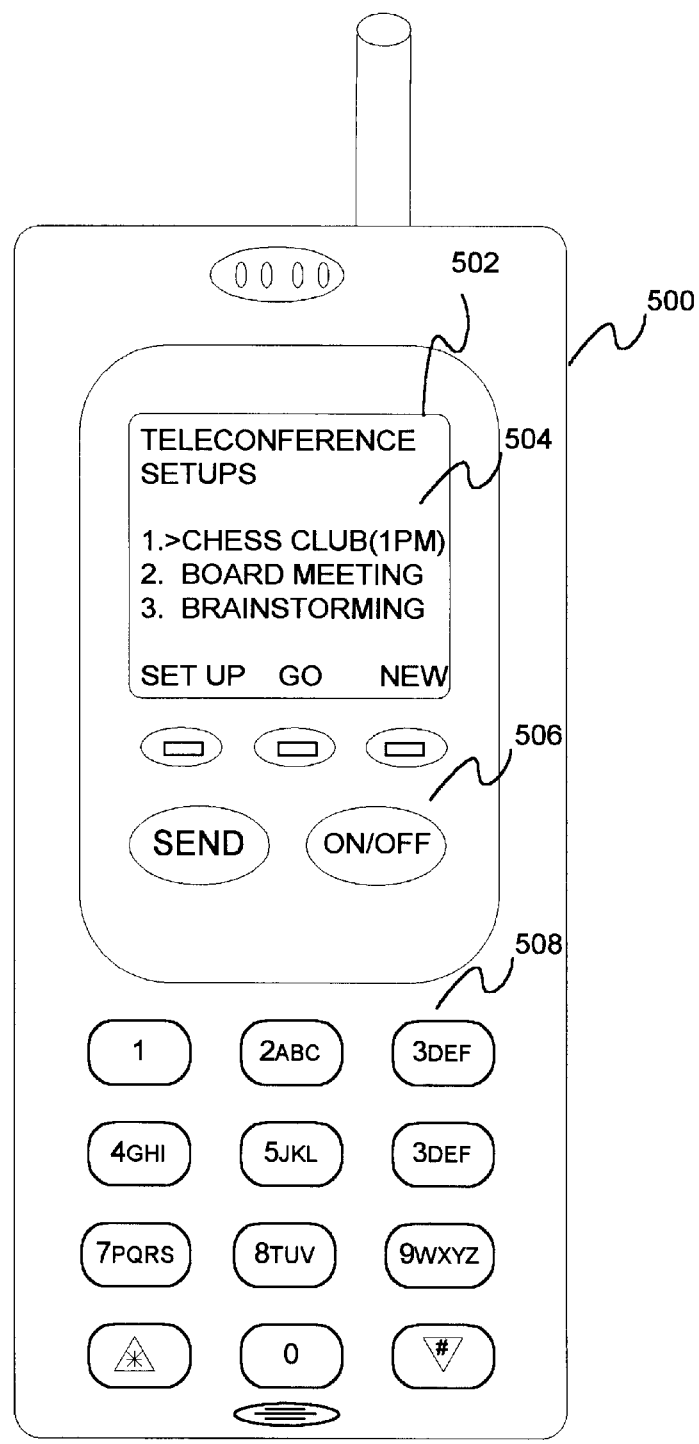
FIGS. 5A and 5B illustrate representative menu display screens for an exemplary wireless communication device which displays information relating to previously stored telephone conferences in conjunction with the implementation of the present invention.

Referring to FIG. 5A, wireless communication device 500 illustrates a representative terminal device which may be used by the coordinator (or a participant) to interact with the coordinating server device (which may be coordinating server device 102 of FIG. 1). Display screen 504 contains a representative display which provides the operator associated with wireless communication device 500 with information about previously setup telephone conferences. In this example, the coordinator could initiate the <CHESS CLUB> by activating the soft key associated with the <GO> label.

Figure 5B:
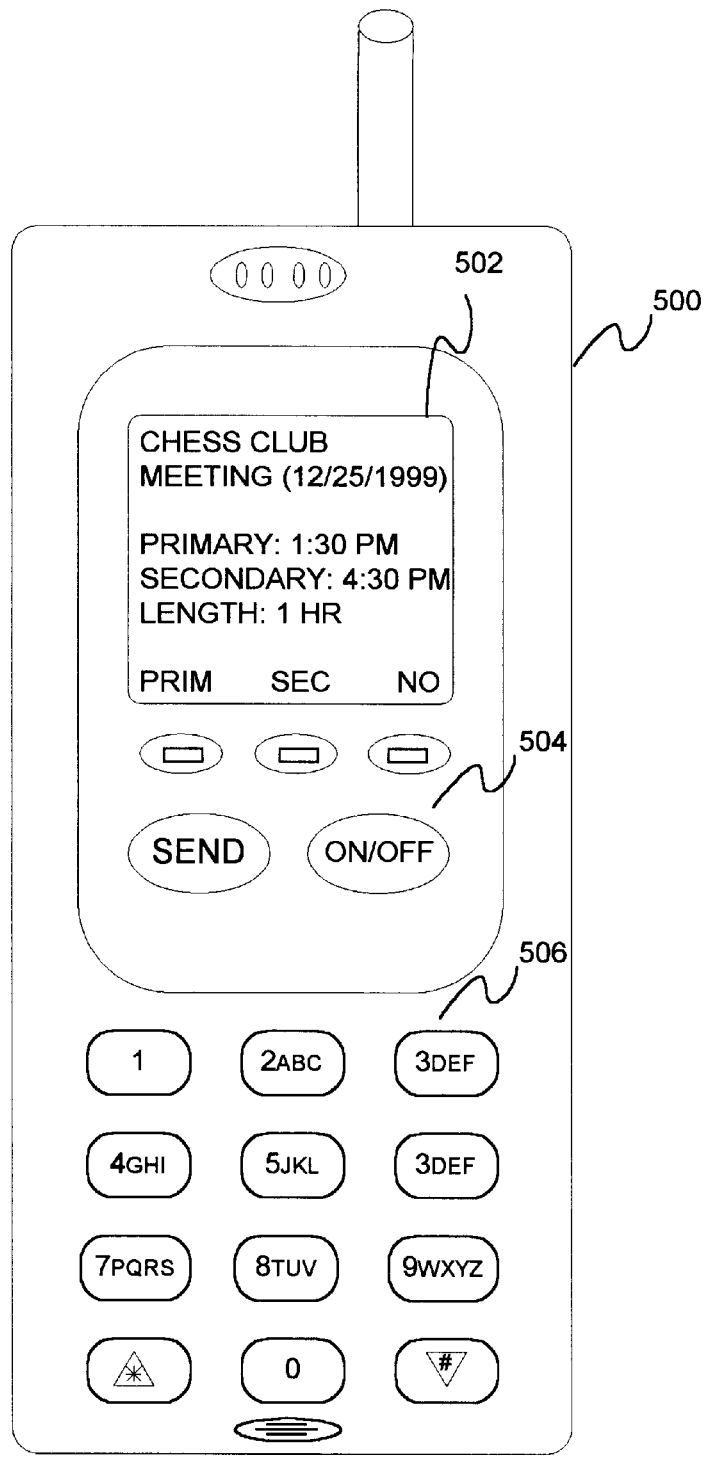

Referring now to FIG. 5B, screen display 510 illustrates an exemplary invitation which may be receive by one of the selected telephone conference participants. Screen display 510 provides descriptive information, the proposed primary and secondary start times and the conference's estimated duration. A participant could accept the primary time by activating the soft key associated with the <PRIM> label, the secondary time by activating the soft key associated with the <SEC> label or decline by activating the soft key associated with the <NO> label.

FIG. 6 illustrates an exemplary schedule that may be maintained by the participants or the coordinator. Using the information contained within the software agents resident on the coordinating server device can determine the participants' or coordinator's preferred contact information for specified time periods.

Figure 7:
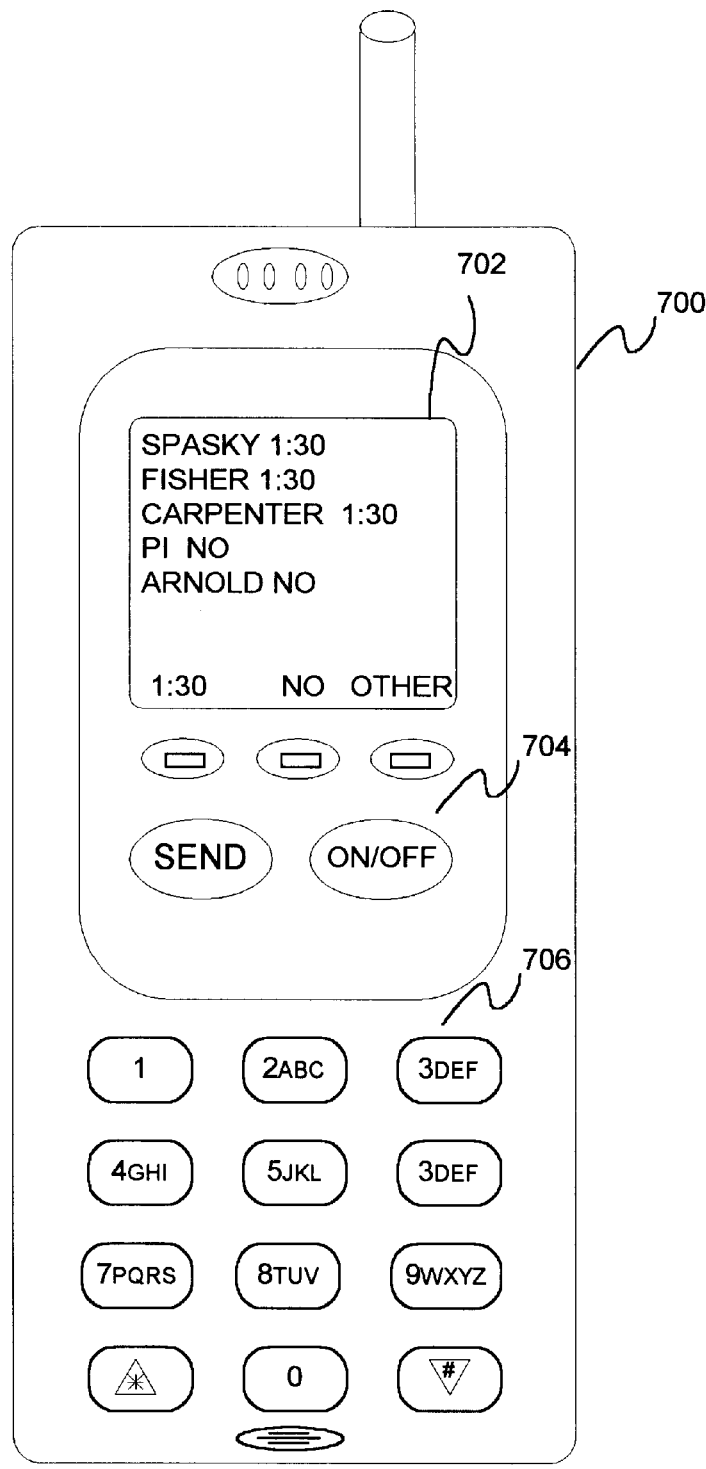
FIG. 7 illustrates a representative menu display screens for an exemplary wireless communication device which displays information relating to participant invitation responses in conjunction with the implementation of the present invention.

Responses to telephone conference invitations are received by the coordinating server device which formulates a control script for the teleconference server (which may be teleconference server 106 of FIG. 1). Additionally, content relating to the response receive by the coordinating server device may be forwarded to a terminal device associated with the coordinator as is illustrated in FIG. 7.

Figure 8:
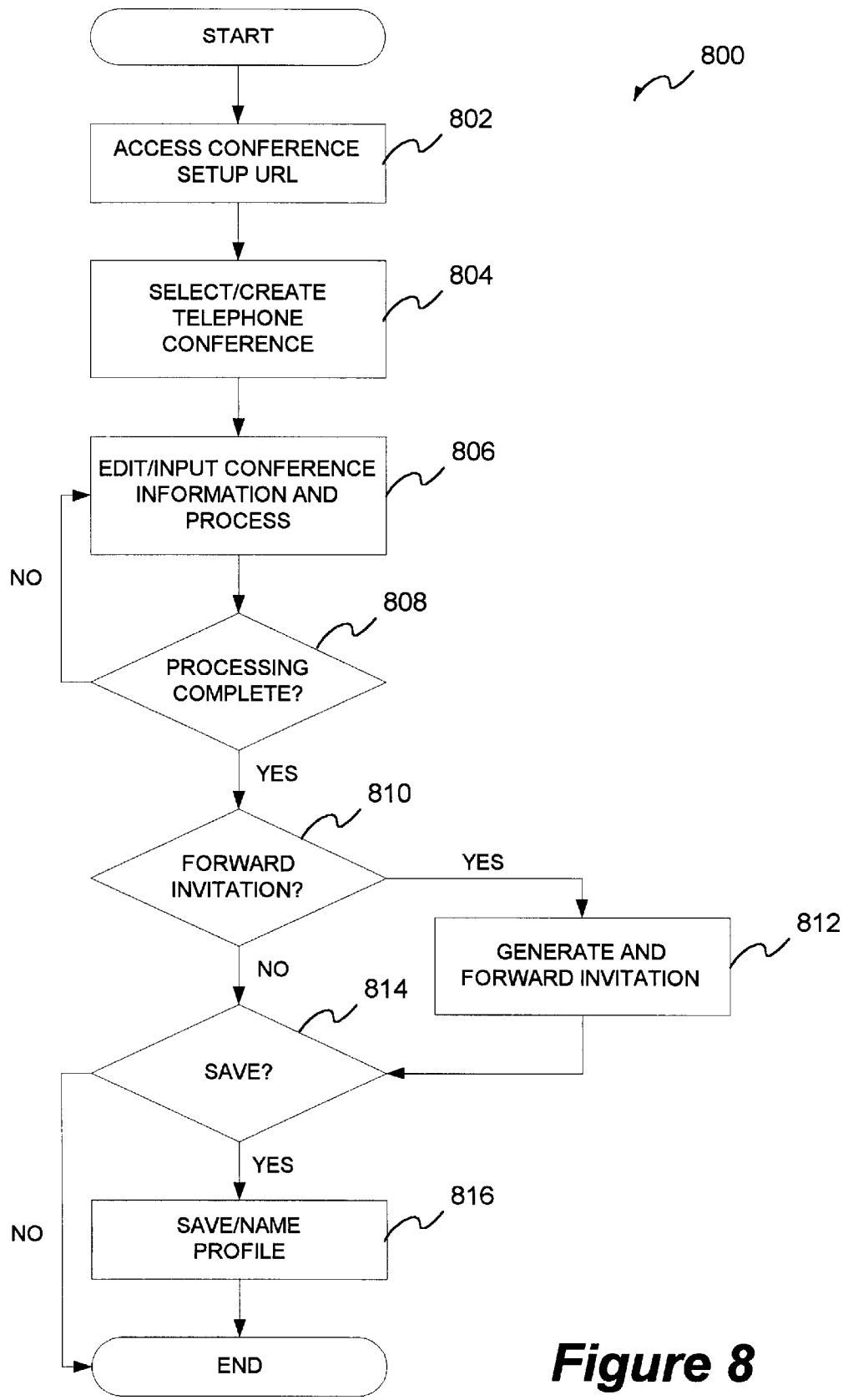
FIG. 8 is flow diagram of the process associated with building, editing and proposing a telephone conference in conjunction with the implementation of the present invention.

FIG. 8 is a flow diagram of the process 800 associated with setting up a telephone conference. At 802, coordinator wishing to propose a telephone conference accesses the telephone conference setup application resident on the coordinating server device by inputting the appropriate uniform resource locator (URN) or similar location address. At 804 the coordinator creates a new telephone conference or selects an existing telephone conference to modify. At 806 the coordinator inputs the telephone conference information or modifies existing telephone conference information. At 808 a determination is made as to whether the information provided by the coordinator and the information retrieved by the resident software agents has been processed. Upon completion of processing, a determination is made at 810 as to whether the coordinator wishes to forward the invitations to the selected participants. If the coordinator decides in the affirmative then the invitations are forwarded at 812. At 814 a determination is made as to whether the generated telephone conference profile information should be saved. At 816 telephone conference profile information to be saved is provided with an identifier and the process is concluded.

Figure 9A:
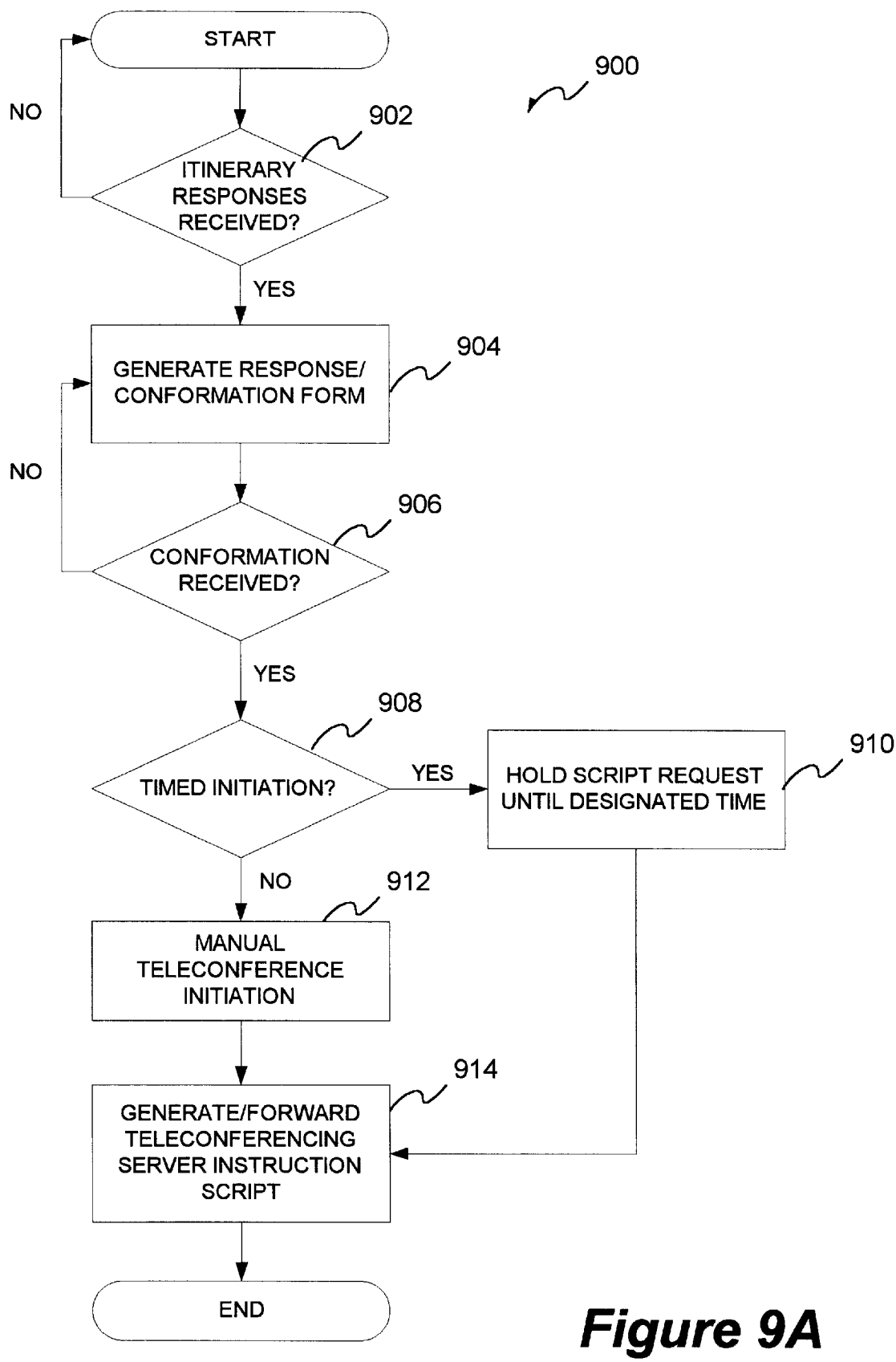
FIGS. 9A and 9B are flow diagrams of the process associated with initiating a previously stored a telephone conference in conjunction with the implementation of the present invention.

FIG. 9A is a flow diagram of the process 900 associated with processing the responses from the participants, forwarding the received information to the coordinator and receiving final instructions from the coordinator. At 902 a determination is made as to whether all the responses have been received from the selected participants or if a pre-established time limit for receipt of those responses has expired. Upon receipt of all the responses or expiration of the pre-determined time interval, the responses are processed and the processed information is forwarded to the coordinator at 904. At 906 a determination is made as to whether the final instructions/conformation has been received from the coordinator. At 908 the coordinator may select timed initiation 910 of the telephone conference or manual initiation 912. At 914 the control script for the telephone conference server is generated and forwarded and the process is concluded.

Figure 9B:
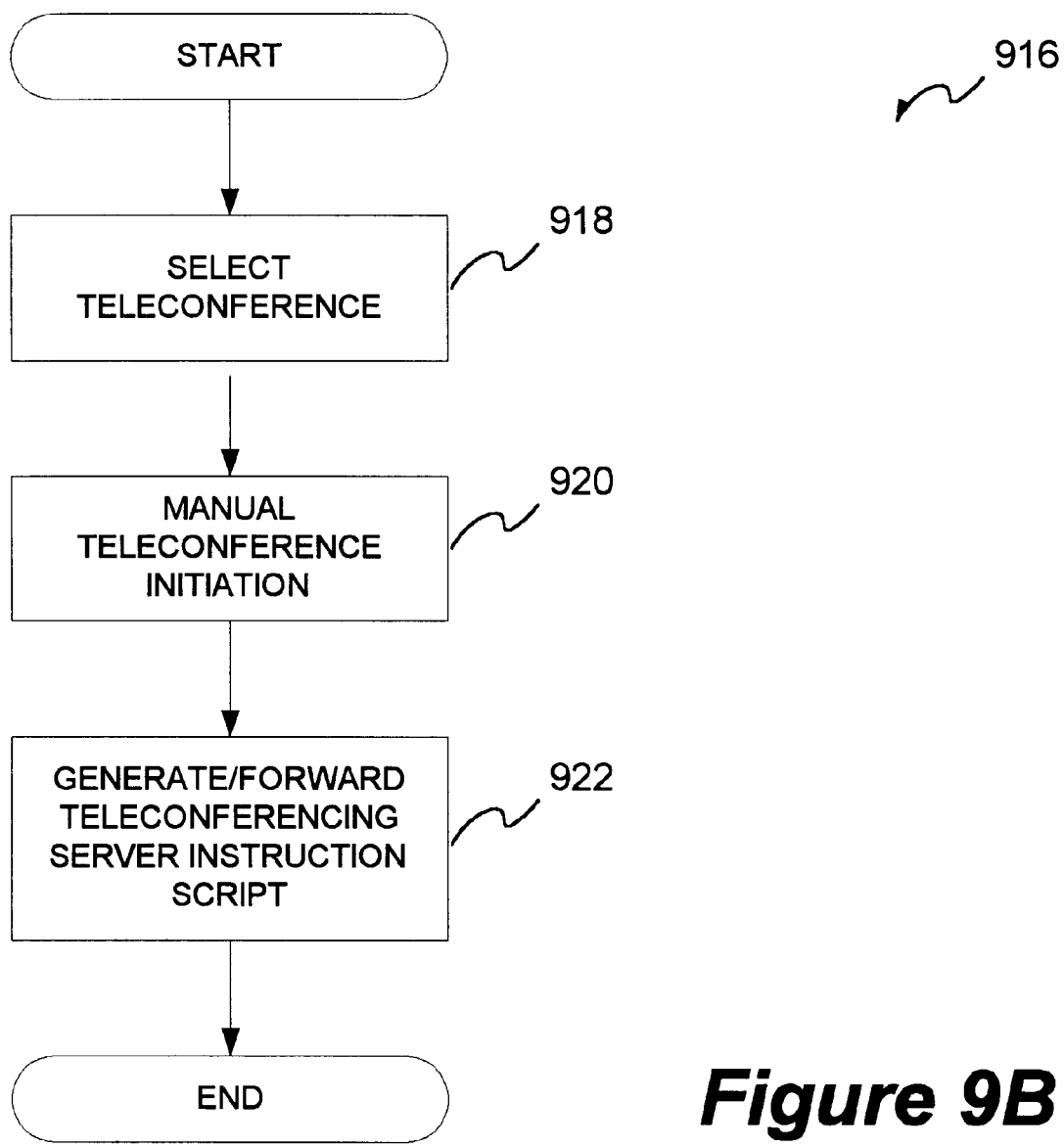

FIG. 9B is a flow diagram of the process 916 associated with manual initiation of the telephone conference from the coordinator's terminal device. At 918 the coordinator selects a telephone conference to initiate and activates the appropriate input element on the user interface associated with the terminal device at 920. An instruction is forwarded to the coordinating server device at 922 which forwards a control script to the telephone conference server. The telephone conference server then initiates calls to the selected participants and the coordinator.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to he exact construction and operation as illustrated and described. Hence, all suitable modifications and equivalents may be considered to fall within the scope of the invention.

I claim:

1. In a multi-point telephone conferencing system including storage areas for storing contact information and schedule information for a plurality of participants, a multi-point telephone conference server and access to wireless and wired communication networks, a method for setting up a multi-point telephone conference between a plurality of participants, the method comprising:

receiving scheduling information for a multi-point telephone conference including identification information for a plurality of selected participants and timing information from a coordination terminal device;

matching the received identification information for the plurality of selected participants with the contact information and schedule information storage areas for the selected plurality of participants;

retrieving contact information corresponding to the timing information received for the multi-point telephone conference from the selected participant contact information and schedule information storage areas;

generating and storing a control script for the multi-point telephone conference server; and forwarding the stored control script to the multi-point telephone conference server.

2. A method as recited in claim 1, wherein the coordination terminal device is selected from a group consisting of a wireless communication device, a personal computing device and a POTS-type telephone device.

3. A method as recited in claim 1, further comprising;

generating invitations containing information relating to the multi-point telephone conference for the plurality of selected participants;

retrieving contact information for forwarding the generated invitations, where the contact information is retrieved from the contact information and schedule information storage areas for the selected plurality of participants; and forwarding the generated invitations to the plurality of selected participants.

4. A method as recited in claim 3, wherein the generated invitations are markup language files.

5. A method as recited in claim 4, wherein the markup language files are selected from a group consisting of Wireless Markup Language (WML), Handheld Device markup Language (HDML), Extensible Markup Language (XML), Hypertext Markup Language (HTML) and Compact Hypertext Markup Language (cHTML).

6. A method as recited in claim 3, further comprising;

receiving responses to the invitations forwarded to the plurality of selected participants; and forwarding the received responses to the invitations to the coordination terminal device.

7. A method as recited in claim 6, wherein the responses to the invitations forwarded to the coordination terminal device are markup language files.

8. A method as recited in claim 7, wherein the markup language files are selected from a group consisting of Wireless Markup Language (WML), Handheld Device markup Language (HDML), Extensible Markup Language (XML), Hypertext Markup Language (HTML) and Compact Hypertext Markup Language (cHTML).

9. A method as recited in claim 3, further comprising;

receiving responses to the invitations forwarded to the plurality of selected participants; and forwarding the received responses to the invitations to a pre-designated terminal device associated with the coordination terminal device.

10. A method as recited in claim 9, wherein the responses to the invitations forwarded to the coordination terminal device are markup language files.

11. A method as recited in claim 10, wherein the markup language files are selected from a group consisting of Wireless Markup Language (WML), Handheld Device markup Language (HDML), Extensible Markup Language (XML), Hypertext Markup Language (HTML) and Compact Hypertext Markup Language (cHTML).

12. A method as recited in claim 1, wherein the retrieving contact information corresponding to the timing information received for the multi-point telephone conference from the selected participant contact information and schedule information storage areas is accomplished using Lightweight Device Access Protocol (LDAP).

13. A method as recited in claim 3, wherein the retrieving contact information for forwarding the generated invitations, where the contact information is retrieved from the contact information and schedule information storage areas for the selected plurality of participants areas is accomplished using Lightweight Directory Access Protocol (LDAP).

14. A server system providing a coordinator with remote access to a multi-point telephone conferencing system including storage areas for storing contact information and schedule information for a plurality of participants, a multi-point telephone conference server and access to wireless and wired communication networks, the system comprising:

a storage means for storing scheduling information for a multi-point telephone conference including identification information for a plurality of selected participants and timing information received from the coordinator;

a memory means for storing a set of program instructions for matching the identification information for the plurality of selected participants with information contained in contact information and schedule information storage areas for the plurality of selected participants;

a processing means connected to the memory means and the storage means and responsive to input received from the coordinator through a communications network, whereby the scheduling information and timing information is used to retrieve time sensitive contact information stored in the contact information and schedule information storage areas for the plurality of selected participants which is then used to generate a script which may be used to control the activities of the multi-point telephone conference server.

15. A server system as recited in claim 14, wherein the communications network is a TCP/IP communications network.

16. A server system as recited in claim 14, wherein the communications network is a wireless communications network.

17. A server system as recited in claim 16, wherein the wireless network is selected from a group consisting of cellular digital packet data (CDPD) network, General Packet Radio Service (GPRS), Global System for Mobile Communication (GSM) network, cellular digital packet data (CDPD) network, Code Division Multiple Access (CDMA) network, Personal Handy Phone System (PHS) and Time Division Multiple Access (TDMA) network.

18. A server system as recited in claim 14, further comprising:

program code for generating invitations containing information relating to the multi-point telephone conference for the plurality of selected participants;

program code for retrieving contact information for forwarding the generated invitations, where the contact information is retrieved from the contact information and schedule information storage areas for the selected plurality of participants; and program code for forwarding the generated invitations to the plurality of selected participants.

19. A server system as recited in claim 14, further comprising:

program code for receiving responses to the invitations forwarded to the plurality of selected participants; and program code for forwarding the received responses to the invitations to the coordination terminal device.

20. A server system as recited in claim 14, further comprising:

program code for implementing a Lightweight Directory Access Protocol (LDAP) software module.

21. A server system as recited in claim 14, further comprising:

program code for receiving a remote initiation command from a terminal device associated with the coordinator.

22. A computer readable medium on which is encoded computer program code for providing a coordinator with remote access to a multi-point telephone conferencing system including storage areas for storing contact information and schedule information for a plurality of participants, a multi-point telephone conference server and access to wireless and wired communication networks, the system comprising:

computer program code for receiving scheduling information for a multi-point telephone conference including identification information for a plurality of selected participants and timing information from a coordination terminal device;

computer program code for matching the received identification information for the plurality of selected participants with the contact information and schedule information storage areas for the selected plurality of participants;

computer program code for retrieving contact information corresponding to the timing information received for the multi-point telephone conference from the selected participant contact information and schedule information storage areas;

computer program code for generating and storing a control script for the multi-point telephone conference server; and computer program code for forwarding the stored control script to the multi-point telephone conference server.

23. A computer readable medium as recited in claim 22, further comprising:

computer program code for generating invitations containing information relating to the multi-point telephone conference for the plurality of selected participants;

computer program code for retrieving contact information for forwarding the generated invitations, where the contact information is retrieved from the contact information and schedule information storage areas for the selected plurality of participants; and computer program code for forwarding the generated invitations to the plurality of selected participants.

24. A computer readable medium as recited in claim 23, further comprising:

computer program code for receiving responses to the invitations forwarded to the plurality of selected participants; and computer program code for forwarding the received responses to the invitations to the coordination terminal device.

\* \* \* \* \*